United States Patent [19]

Berthet et al.

[11] Patent Number: 5,118,738

[45] Date of Patent: * Jun. 2, 1992

[54] FILLED COMPOSITIONS

[75] Inventors: Michelle M. N. C. Berthet, Brussels, Belgium; Brian R. Trego, Dinas Powys, Wales; Hans-Juergen Wessely, Nivelles, Belgium

[73] Assignee: Dow Corning S.A., Seneffe, Belgium

[*] Notice: The portion of the term of this patent subsequent to Dec. 17, 2008 has been disclaimed.

[21] Appl. No.: 511,880

[22] Filed: Apr. 20, 1990

Related U.S. Application Data

[63] Continuation of Ser. No. 259,390, Oct. 18, 1988, abandoned.

[30] Foreign Application Priority Data

Oct. 24, 1987 [GB] United Kingdom ............... 8724959

[51] Int. Cl.⁵ .................................................. C08K 5/41
[52] U.S. Cl. ..................................... 524/159; 524/161; 524/166; 524/745; 524/746; 524/787; 524/788; 524/860; 524/863
[58] Field of Search ............... 524/161, 166, 159, 745, 524/860, 787, 788, 863, 746

[56] References Cited

U.S. PATENT DOCUMENTS

| | | | |
|---|---|---|---|
| 4,269,761 | 5/1981 | Suhoza | 260/45.7 |
| 4,307,009 | 12/1981 | Luders et al. | 260/42.14 |
| 4,386,169 | 5/1983 | Artur et al. | 523/200 |
| 4,456,710 | 6/1984 | Luders et al. | 523/200 |
| 4,482,670 | 11/1984 | Saam et al. | 524/860 |
| 4,508,887 | 2/1985 | Kohl | 528/21 |
| 4,608,412 | 8/1986 | Freiberg | 524/724 |

Primary Examiner—John C. Bleutge
Assistant Examiner—R. Dean, Jr.
Attorney, Agent, or Firm—Edward C. Elliott

[57] ABSTRACT

The specification describes and claims filled compositions, e.g. moisture curable sealant compositions which comprise 100 parts by weight of polymeric material comprising a mixture and/or a reaction product of a polydiorganosiloxane having silicon-bonded hydroxyl groups with a compound containing silicon-bonded alkoxy or alkoxyalkoxy groups, 50 to 200 parts by weight of finely divided filler and an additive which is a reaction product of an organic amine, an oxide, hydroxide, carbonate, bicarbonate or a mixture thereof with a sulphonic acid of the formula $RSO_3H$ in which R represents a hydrocarbon group which may be halogenated. The additive is preferably a reaction product of the sulphonic acid and an oxide, hydroxide, carbonate or bicarbonate of magnesium, or calcium and the acid is preferably one in which R represents a group $R'C_6H_4$ wherein R' represents an alkyl group having 6 to 18 carbon atoms, for example dodecylbenzenesulphonic acid. The filler is preferably an oxide, hydroxide, carbonate or bicarbonate of calcium, magnesium, barium or zinc or a mixture thereof and has a particle size in the range 0.05 to 5 microns.

19 Claims, No Drawings

FILLED COMPOSITIONS

This is a continuation of copending application 07/259,390 filed on Oct. 18, 1988, now abandoned.

This invention is concerned with filled compositions.

Numerous formulations for room temperature curable compositions have been proposed. One type of silicone based room temperature curable composition relies on atmospheric moisture to effect cross linking and chain extension of polysiloxanes through hydrolysis of silicon-bonded alkoxy groups with formation of siloxane linkages in the polymer. Compositions of this type have various advantages, among which is the fact that by-products of the reaction are alcohols, principally the lower alkyl alcohols, which are acceptably neutral and desirable for many applications for example in the fields of potting compositions and sealants. Whilst many of the characteristics of these compositions are desirable ones, their cure rate and modulus characteristics render them less suitable for certain uses.

It is a practice in the preparation of compositions of this type to employ fillers, extenders, cross-linkers, adhesion promoters, catalysts, colorants and various other additives as desired. Finely divided fillers make important contributions to cost and rheology of the composition and to properties of articles formed from the composition, for example, abrasion resistance, tensile and tear strength, hardness and modulus. For example, fine particle fumed silicas are used in compositions from which silicone rubbers are made in order to improve strength in the cured rubber. Inclusion of increased amounts of filler in a liquid composition leads to stiffening of the composition and a reduction in flowability of the composition, which leads to a need for increased applied shear during mixing to achieve the desired homogenous mixed state of the composition as greater amounts of filler are used. The proportion of a filler employed in any particular composition may be selected bearing in mind the rheology required of the composition in its liquid state, compatibility of the filler and polymer, and the shape and size of the filler particles as well as properties required of articles formed from the composition.

Among the fillers commonly employed in silicone based compositions are the silicas, clays and basic materials, for example carbonates as exemplified by calcium carbonate. Calcium carbonate fillers are commonly available in stearate coated form. Calcium carbonate is also well known as a filler in compositions which employ polymeric materials other than silicones. With a view to improving certain aspects of the performance of basic fillers principally associated with compatibility of the filler and base polymer, various proposals have been made for the treatment of such fillers with, for example saturated carboxylic acids. For example, U.S. Pat. No. 4,386,169 discloses the reinforcement of elastomeric/polymeric matrices as exemplified by e.g. polyvinyl chloride with calcium carbonate filler surface treated with both an organic sulphonic acid or salt thereof and a fatty acid or salt thereof in amounts to enhance impact strength thereof. European Patent Specification 83 084 discloses a composition comprising polyoxymethylene, an alkaline earth carbonate and a small amount of an alkali or alkaline earth salt of selected sulphonic acids; the compositions are said to have improved flow, mechanical properties and colour retention. European Patent Specification 17 038 discloses thermoplastic, filler containing, polyolefin compositions in which the filler comprises an alkaline earth carbonate and a small amount of specified sulphonic acids or their alkali metal salts; the compositions are said to have improved physical properties especially toughness of the moulded composition. European Patent Specification 16 986 discloses enhancing the thermal stability of polymeric compositions containing polymeric material as exemplified by polyolefins, filler and an ammonium, alkali metal or alkaline earth metal salt of monoalkyl or dialkylnapthalene sulphonic acid.

Surprisingly we have now found that the ability of compositions comprising a polymeric material comprising a mixture and/or a reaction product of a polydiorganosiloxane having silicon-bonded hydroxyl groups with a compound containing silicon-bonded alkoxy or alkoxy-alkoxy groups and a finely divided filler to become cured at room temperature irrespective of ambient humidity may be improved by inclusion in the composition of certain additives derived from selected sulphonic acids.

The present invention provides in one of its aspects a composition comprising 100 parts by weight of a polymeric material comprising the product obtained by mixing a polydiorganosiloxane having silicon-bonded hydroxyl groups with a compound containing silicon-bonded alkoxy or alkoxy-alkoxy groups, 50 to 200 parts by weight of finely divided filler consisting of a metal oxide, hydroxide, carbonate, or bicarbonate of calcium, magnesium, barium, or zinc, or mixtures thereof, the filler having an average particle size of greater than 0.05 micron, and a minor amount based on the weight of the filler of an additive which consists of a reaction product of an organic amine or a metal oxide, hydroxide, carbonate, or bicarbonate of calcium, magnesium, barium, or zinc or a mixture thereof with a sulphonic acid of the formula $RSO_3H$ in which R represents a hydrocarbon group which may be halogenated.

Fillers employed in compositions according to the invention may be those which show a significant reinforcing effect, or those which do not, or a mixture thereof. Preferably a composition according to the invention employs more than 50 parts by weight per 100 parts by weight polymer of a basic filler which may be, for example, an oxide, hydroxide, carbonate or bicarbonate of, for example, calcium, magnesium, barium or zinc or mixtures thereof. The filler may be produced by grinding or precipitation methods to provide filler particles of an average particle size greater than 0.05 microns, for example in the range 0.05 micron to 5 microns. Compositions in which the filler consists solely of materials having an average particle size of less than 0.05 micron, for example fumed silicas, do not show the combination of advantageous properties shown by compositions according to the invention in which the sole filler used is calcium or magnesium carbonate. However, materials having an average particle size of less than 0.05 micron may be included as a minor proportion of the composition. We prefer to employ calcium or magnesium carbonate as the filler as these materials are generally readily available. The carbonate used may be a surface treated material (for example, a stearate coated calcium carbonate) or an untreated material.

Compounds suitable for use in the preparation of an additive for use in the present invention are those which are basic and thus capable of reaction with the acid to form a salt, for example, organic amines and oxides, hydroxides, carbonates and bicarbonates of sodium, magnesium, zinc, calcium, barium, aluminium and mixtures thereof. The carbonates used may be surface treated or not as aforesaid.

Sulphonic acids suitable for use in the preparation of the additive for use in the present invention are of the formula $RSO_3H$ in which R represents a hydrocarbon group which may be halogenated and may consist of or comprise an aliphatic chain of up to about 20 carbon atoms. The nature of R appears important. For example, ethyl sulphonates reduce dependence of the cure rate on the extent of humidity, whereas certain alkaryl sulphonates, for example, ethylbenzene sulphonates contribute to a reduction of the energy required for mixing the composition. Preferred acids are those which yield salts which are readily dispersed throughout the composition. In addition to their ability to effect a reduction in the dependence on the extent of humidity on the rate of curing in the atmosphere at room temperature of compositions according to the invention, additives formed by use of selected sulphonic acids also contribute to modification of other properties of the composition, for example, a reduction in the energy required to adequately mix the composition and a variation (which is frequently a significant reduction) in the modulus of cured products formed by use of the composition. Preferred acids include those in which the group R comprises an alkyl chain of more than 6 carbon atoms, preferably of 6 to 18 carbon atoms, for example hexylsulphonic acid and dodecylsulphonic acid and those having a halogenated alkyl group having up to 18 carbon atoms. The most preferred acids are of the formula $R'C_6H_4SO_3H$ where R' represents a group R as defined above and is preferably an alkyl group having 6 to 18 carbon atoms. A preferred acid is dodecylbenzenesulphonic acid, hereinafter referred to as DBSA.

In a composition according to the invention, the additive may be incorporated into the composition in any convenient way. For example, the salt may be prepared in advance of its admixture with the polymer and filler, or it may be formed in situ by addition of the appropriate acid to a composition comprising the polymer and a compound reactive with the acid to form the salt or by addition to a composition containing the polymer and appropriate acid of a compound reactive with the acid to form the salt. The calcium salts may be prepared in advance of admixture with the composition by, for example, adding the acid to an aqueous dispersion of calcium carbonate filler. One convenient way of providing filler containing the additive is to treat a batch of filler, for example of calcium or magnesium carbonate, with a proportion of the selected sulphonic acid sufficient to provide for example not less than 0.5 part by weight of the additive per 100 parts by weight of the filler. The treated batch or a portion thereof may be mixed with the desired proportion of polymer to provide a composition according to the invention.

A composition according to the invention may comprise a large proportion of the additive if desired, but in most cases we prefer to employ less than about 10, preferably less than about 5 parts by weight of the additive per 100 parts of the filler in order to achieve satisfactory beneficial properties. Properties of some compositions may be adversely affected if larger proportions of the additive are present. An improvement in the independence of the cure rate with respect to humidity may be acheived by use of very small amounts of the additive, e.g. as little as 0.2 parts by weight additive per 100 parts by weight filler. In order to achieve, in addition, a product of reduced modulus, it is necessary to use amounts of 0.5 part or more of the additive per 100 parts by weight filler. Compositions containing about 1 to 1.5 parts by weight of additive per 100 parts by weight of filler have a blend of properties particularly suitable for low modulus sealants for example. We prefer to prepare the additive by treating a finely divided solid (e.g. the filler) metal oxide, hydroxide, carbonate, bicarbonate or a mixture thereof with the sulphonic acid, preferably in presence of the polymer, in proportions of 100 moles of the metal compound to 0.2 (more preferably 0.5) to 5.0 moles of the sulphonic acid.

As mentioned above, compositions according to the invention demonstrate cure properties of improved uniformity despite humidity variations, and may also demonstrate a variety of other improved properties, as compared with corresponding compositions which do not contain the additive. The additive salts thus find use, for example, in one part moisture curable compositions capable of curing at ambient temperature upon exposure to the atmosphere. For example, compositions based on 100 parts by weight polysiloxane comprising a mixture and/or a reaction product of $\alpha,\omega$ dihydroxy polydiorganosiloxanes and alkyl trialkoxy silane, 100 to 175 parts by weight stearate coated calcium carbonate, a minor amount of silica, a titanate catalyst and not less than 1.5 parts of the preferred additive demonstrate ability to become cured at a substantially constant rate at relative humidities in the range 30 to 100%, improved processing and reduced modulus.

Polymeric materials suitable for use in a composition according to the invention include the polysiloxanes used for one and two part room temperature vulcanising silicone elastomers which may be employed, for example as protective coatings, encapsulants or sealants. Polydiorganosiloxanes having silicon-bonded hydroxyl groups suitable for use in a composition according to the invention include the $\alpha,\omega$ dihydroxypolysiloxanes represented by the general formula $HO(R''_2SiO)_xH$ wherein each $R''$ represents for example, a saturated or unsaturated, substituted or unsubstituted hydrocarbon group for example an alkyl group having up to twelve carbon atoms (e.g. methyl, ethyl, propyl, vinyl or allyl) or an aromatic group (e.g. phenyl) and x is an integer which may be, for example, such that the polymer has the consistency of a fluid or a gum. These are well known materials and may be made by procedures well known in the art. Usually they are made by the addition of diorganodichlorosilanes to a water/solvent mixture to yield a mixture of low molecular weight hydroxy end-blocked oligomers and cyclic siloxanes in solvent. The mixture may be purified to separate low molecular weight linear $\alpha,\omega$ dihydroxypolydiorganosiloxane oligomers and cyclic polysiloxanes. Linear $\alpha,\omega$ dihydroxy polydiorganosiloxane polymers of desired molecular weight may be manufactured from the low molecular weight linear $\alpha,\omega$ dihydroxy polydiorganosiloxane oligomers (produced as aforesaid or by a process involving ring opening of the cyclic materials referred to) by way of condensation and equilibration in presence of catalyst. The catalyst used for manufacture by way of bulk polymerisation is generally a basic catalyst which can be removed from the reaction mixture. One may also prepare a hydroxypolysiloxane by chain extension of an $\alpha,\omega$ dihydroxy polydiorganosiloxane at room temperature in a short time to a high viscosity fluid or a gum by agitation in an open or closed mixing chamber for example a static mixer, planetary mixer or twin screw extruder in presence of an acid, for example dodecylbenzene sulphonic acid as condensation catalyst and water in controlled proportions. Thus, one may produce polymers having a value of x such that the polymers have a viscosity in the range of 30 mm²/s to 2,000.000 mm²/s. In preferred materials at least 85% and preferably all of the R" groups are methyl and x has a value such that the viscosity of the polysiloxane lies in the range of about 30 mm²/s to 100,000 mm²/s. These polymers may be formulated into one or two package compositions by admixture with catalysts and compounds having a plurality of silicon-bonded alkoxy or alkoxy-alkoxy groups to form a mixture and/or a reaction product of the polydiorganosiloxane having silicon-bonded hydroxyl groups with the compound containing silicon-bonded groups, which is reactive at room temperature under influence of, for example, atmospheric moisture to form a cured silicone rubber. Suitable compounds having silicon-bonded alkoxy or alkoxy-alkoxy groups are the known moisture vapour activated crosslinkers for example methyltrimethoxy silane, methyltrihexanoxy silane and phenyltrimethoxy silane. Suitable catalysts are the titanium compounds, for example alkyl titanates and alkyl titanium esters for example tetraisobutyl titanate and tetraisopropyl titanate. Tin salts of organic acids may be employed as co-catalyst. Suitable tin salts include tin salts of carboxylic acids and particularly the stannous salts of the more commonly available carboxylic acids, for example dibutyl tin dilaurate, stannous acetate, stannous napthenate, stannous benzoate, stannous sebacate, stannous succinate and stannous octoate.

One may also include in a composition according to the invention the usual optional additives, for example, colorants, antioxidants, liquid extenders, for example trimethylsiloxy end-blocked polydimethylsiloxane fluid (hereinafter referred to as pdms fluid) and adhesion promoters.

A composition according to the invention may be prepared by mixing the ingredients together in any desired order. For example, preferred one part sealant compositions which are curable at room or ambient temperature in presence of moisture may be made by adding a metal carbonate as filler to a polydiorganosiloxane having a viscosity of about 1,000 to 100,000 mm²/s and having silicon-bonded hydroxyl groups, adding the sulphonic acid in appropriate amount to form the desired proportion of the additive in situ and then adding the catalyst and cross linking agent. The additive may be added in the form of the prepared salt to the polymer - filler mixture. If this route is chosen, it is preferred to add the salt as a dispersion in water and to remove the water e.g. by vacuum distillation. It is also possible to add the metal compounds to polymer containing the acid in order to form the additive in situ. It is necessary to remove excess water from the mixture before the crosslinking agent is added. Colorants and minor additives may be added to the mixture at any desired stage, and this is preferably done as near the end of the mixing procedure as possible.

In order that the invention may become more clear, there follows a description of example compositions provided by the invention and illustrative thereof. In the examples, all parts are expressed by weight unless otherwise specified.

EXAMPLE 1

A one part room temperature curing sealant formulation was prepared by mixing 100 parts of linear $\alpha,\omega$ dihydroxypolydimethylsiloxane having a viscosity of about 50,000 mm²/s, 30 parts pdms fluid, and 130 parts 2.5% stearate coated calcium carbonate having a particle size of 0.07 micron. Example compositions 1 to 5 were prepared from portions of this mixture by addition of 2.5 parts per 100 parts of the hydroxy polysiloxane of salt or acid as listed in Table 1. DBSA means dodecylbenzene sulphonic acid, NaDBS means sodium dodecylbenzene sulphonate (added as a paste with water subsequently removed), EBSA means 4-ethylbenzene sulphonic acid and ESA means ethanesulphonic acid. To each of the portions there were added 10 parts per 100 parts of the hydroxy polysiloxane of a curative blend comprising 7 parts methyl trimethoxysilane, 2.5 parts titanium diisopropoxy di(ethylacetoacetate) and 0.2 part N-$\beta$-aminoethyl-$\gamma$-aminopropyltrimethoxysilane. The compositions were mixed in a planetary mixer. The effectiveness of additives added as the metal salts or formed by reaction of the added acid and calcium carbonate filler, in various aspects was determined as follows. For convenience the effectiveness of each additive is referred to by the identity of the acid or salt added. It was found that the effectiveness of the additives in reducing the energy required to stir the mixtures, after inclusion of the salt or acid and before addition of the curative blend was, in order of increasing effectiveness, ESA, NaDBSA, EBSA, DBSA.

The Example compositions were cast to form 2mm thick sheets and allowed to cure at 23° C. in a controlled atmosphere at relative humidities of 30%, 80% and 100%. The time in minutes required for the curing composition to become tack free is recorded in Table 1.

TABLE 1

| Example | Additive | 30% RH | 80% RH | 100% RH |
|---|---|---|---|---|
| Composition 1 | nil | 31 | 56 | 65 |
| Composition 2 | DBSA | 24 | 25 | 28 |
| Composition 3 | NaDBSA | 14 | 19 | 21 |
| Composition 4 | EBSA | 17 | 23 | 27 |
| Composition 5 | ESA | 15 | 21 | 24 |

Referring to the increase in tack free time with relative humidity for each composition, the order of increasing effectiveness of the additives in rendering cure rate of the composition less dependent on the extent of humidity was EBSA, ESA, NaDBSA, DBSA. Also, all of the compositions 2 to 5 demonstrate an improved tack free time irrespective of humidity as compared with composition 1 at 30% RH.

The Example compositions were cast to form 2 mm thick sheets and allowed to cure at 23° C. in a relative humidity of 50% for 7 days. Samples cut from the sheets were tested to determine hardness (H) in shore A, tensile strength (TS) in MPa, elongation at break (EB) as a percentage of initial length of the sample and modulus at 100% extension (M) in MPa. Results are recorded in Table 2.

TABLE 2

| Example | Additive | H | TS | EB | M |
|---|---|---|---|---|---|
| Composition 1 | nil | 32 | 2.59 | 385 | 0.82 |
| Composition 2 | DBSA | 24 | 1.93 | 730 | 0.42 |
| Composition 3 | NaDBSA | 14 | 19 | 21 | |
| Composition 4 | EBSA | 36 | 2.11 | 415 | 0.85 |

TABLE 2-continued

| Example | Additive | H | TS | EB | M |
| --- | --- | --- | --- | --- | --- |
| Composition 5 | ESA | 33 | 2.31 | 340 | 0.92 |

From these results it can be shown that Example compositions 2 and 3 had EB values in excess of 600% and M values of less than 0.55 whereas composition 1 had an EB of 385% and an M value of 0.82. It is noted that Example composition 4 had elongation and modulus values rather similar to those of the comparative Example composition 1 and that Example composition 5 had higher modulus and lower elongation values than composition 1.

EXAMPLE 2

A one part room temperature curing sealant formulation was prepared by mixing 100 parts of linear $\alpha, \omega$ dihydroxy polydimethylsiloxane having a viscosity of about 50,000 mm$^2$/s, 30 parts pdms fluid, 180 parts ground, stearate coated, calcium carbonate having a particle size of 2 microns and 12 parts fumed silica having a particle size of 0.001 micron. The mixture was divided into two portions. A first of the portions (A) was used as such. The second portion (B) also included 2.7 parts of DBSA per 100 parts of the hydroxy polysiloxane. The portions were mixed in a planetary mixer. Example compositions 6 and 7 were obtained from portions (A) and (B) respectively by addition of a mixture of 7 parts methyl trimethoxysilane, 2 parts titanium diisopropoxy-diethylacetoacetate and 0.2 part N-$\beta$-amino-ethyl-$\gamma$-aminopropyltrimethoxysilane per 100 parts of the hydroxy polysiloxane.

The Example compositions were cast to form 2 mm thick sheets and allowed to cure at 23° C. in a controlled atmosphere at relative humidities of 30% and 80%. The time in minutes required for the curing composition to become tack free is recorded in Table 3.

TABLE 3

| Example | 30% RH | 80% RH |
| --- | --- | --- |
| Composition 6 | 58 | 91 |
| Composition 7 | 51 | 56 |

It is noted that Example composition 7 cured at substantially the same rate irrespective of the extent of humidity.

The Example compositions were cast to form 2 mm thick sheets and allowed to cure at 23° C. in a relative humidity of 50% for 7 days. Samples cut from the sheets were tested to determine (H), (TS), (EB), (M) as in Example 1. Results are recorded in Table 4.

TABLE 4

| Example | H | TS | EB | M |
| --- | --- | --- | --- | --- |
| Composition 6 | 25 | 0.64 | 525 | 0.37 |
| Composition 7 | 12.5 | 0.63 | 620 | 0.19 |

The reduced modulus, increased elongation and reduced hardness of Example composition 7 are noted.

That which is claimed is:

1. A non-aqueous composition comprising 100 parts by weight of polymeric material comprising the product obtained by mixing a polydiorganosiloxane having silicon-bonded hydroxyl groups with a compound containing silicon-bonded alkoxy or alkoxyalkoxy groups, 50 to 200 parts by weight of finely divided filler consisting of metal oxide, hydroxide, carbonate, or bicarbonate of calcium, magnesium, barium, or zinc, or mixtures thereof, the filler having an average particle size of greater than 0.05 micron, and a minor amount based on the weight of the filler of an additive which consists of a reaction product of an organic amine or a metal oxide, hydroxide, carbonate, or bicarbonate of calcium, magnesium, barium, or zinc, or a mixture thereof with a sulphonic acid of the formual $RSO_3H$ in which R represents a hydrocarbon group which may be halogenated.

2. A composition according to claim 1 wherein the additive is a reaction product of sulphonic acid and a metal oxide, hydroxide, carbonate or bicarbonate of, magnesium, zinc, calcium, barium, or a mixture thereof.

3. A composition according to claim 1 wherein R represents a group $R'C_6H_4$ wherein R' represents an alkyl group having 6 to 18 carbon atoms.

4. A composition according to claim 3 wherein the sulphonic acid is dodecylbenzenesulphonic acid.

5. A composition according to claim 1 wherein the filler has an average particle size in the range of 0.05 micron to 5 microns.

6. A composition according to claim 1 wherein the additive provide less than 5 parts by weight per 100 parts by weight of filler.

7. A composition according to claim 1 wherein the filler and additive comprise the product formed by treating 100 moles of the metal oxide, hydroxide, carbonate, bicarbonate, or a mixture thereof with 0.5 to 5.0 moles of the sulphonic acid.

8. A composition according to claim 1 wherein the polydiorgano siloxane having silicon-bonded hydroxyl groups in an $\alpha,\omega$ dihydroxypolysiloxane of the general formula $HO(R''_2SiO)_xH$ wherein each R'' represents a saturated or unsaturated, substituted or unsubstituted hydrocarbon group and x is an integer such that the polymer has a viscosity in the range 30 mm$^2$/s to 100,000 mm$^2$/s.

9. A composition according to claim 1 wherein the compound containing silicon-bonded alkoxy or alkoxyalkoxy groups is methyl tri(methoxy)silane.

10. A composition according to claim 1 wherein the filler and additive consist of the product formed by treating 100 moles of metal oxide, hydroxide, carbonate, or bicarbonate of calcium, magnesium, barium, or zinc or a mixture thereof with 0.5 to 5.0 moles of the sulphonic acid.

11. In a non-aqueous composition comprising 100 parts by weight of polymeric material comprising the product obtained by mixing a polydiorganosiloxane having silicon-bonded hydroxyl groups with a compound containing silicon-bonded alkoxy or alkoxyalkoxy groups and 50 to 200 parts by weight of finely divided, basic filler, at least 50 percent by weight of the filler having an average particle size of greater than 0.05 micron, the improvement comprising the use of an additive which consists of a reaction product of an organic amine, a metal oxide, hydroxide, carbonate, bicarbonate, or a mixture thereof with a sulphonic acid of the formula $RSO_3H$ in which R represents a hydrocarbon group which may be halogenated, to improve cure characteristics of the composition.

12. A non-aqueous composition comprising 100 parts by weight of polymeric material comprising the product obtained by mixing a polydiorganosiloxane having silicon-bonded hydroxyl groups with a compound containing silicon-bonded alkoxy or alkoxyalkoxy groups, 50 to 200 parts by weight of finely divided filler consisting essentially of a metal oxide, hydroxide, carbonate, or bicarbonate of calcium, magnesium, barium, or zinc, or mixtures thereof, at least 50 percent by weight of the filler having an average particle size of greater than 0.05 micron, and a minor amount based on the weight of the filler of an additive which consists of a reaction product of an organic amine or a metal oxide, hydroxide, carbonate, or bicarbonate of calcium, magnesium, barium, or zinc, or a mixture thereof with a sulphonic acid of the formula $RSO_3H$ in which R represents a hydrocarbon group which may be halogenated.

13. A non-aqueous composition comprising essentially of 100 parts by weight of polymeric material comprising the product obtained by mixing a polydiorganosiloxane having silicon-bonded hydroxyl groups with a compound containing silicon-bonded alkoxy or alkoxyalkoxy groups, 50 to 200 parts by weight of finely divided filler consisting of a metal oxide, hydroxide, carbonate, or bicarbonate of calcium, magnesium, barium, or zinc, or mixtures thereof, at least 50 percent by weight of the filler having an average particle size of greater than 0.05 micron, and a minor amount based on the weight of the filler of an additive which consists of a reaction product of an organic amine or a metal oxide, hydroxide, carbonate, or bicarbonate of calcium, magnesium, barium, or zinc, or a mixture thereof with a sulphonic acid of the formula $RSO_3H$ in which R represents a hydrocarbon group which may be halogenated.

14. A composition according to claim 13 wherein R represents a group $R'C_6H_4$ wherein $R'$ represents an alkyl group having 6 to 18 carbon atoms.

15. A composition according to claim 14 wherein the sulphonic acid is dodecylbenzenesulphonic acid.

16. A composition according to claim 13 wherein the filler has an average particle size in the range of 0.05 to 5 micron.

17. A composition according to claim 13 wherein the additive provide less than 5 parts by weight per 100 parts by weight of filler.

18. A composition according to claim 13 wherein the polydiorganosiloxane having silicon-bonded hydroxyl groups in an alpha, omega, dihydroxypolysiloxane of the general formula $HO(R''_2SiO)_xH$ wherein each $R''$ represents a saturated or unsaturated, substituted or unsubstituted hydrocarbon group and X is an integer such that the polymer has a viscosity in the range 30 to 100,000 $mm^2/s$.

19. A composition according to claim 18 wherein the compound containing silicon-bonded alkoxy or alkoxyalkoxy groups is methyltrimethoxysilane.

* * * * *